Feb. 6, 1968 C. F. JOHNSON 3,367,002
AUTOMATIC SLIP SETTING DRILL PIPE SUSPENSION APPARATUS
Filed Aug. 9, 1966 3 Sheets-Sheet 1

INVENTOR.
Charles F. Johnson

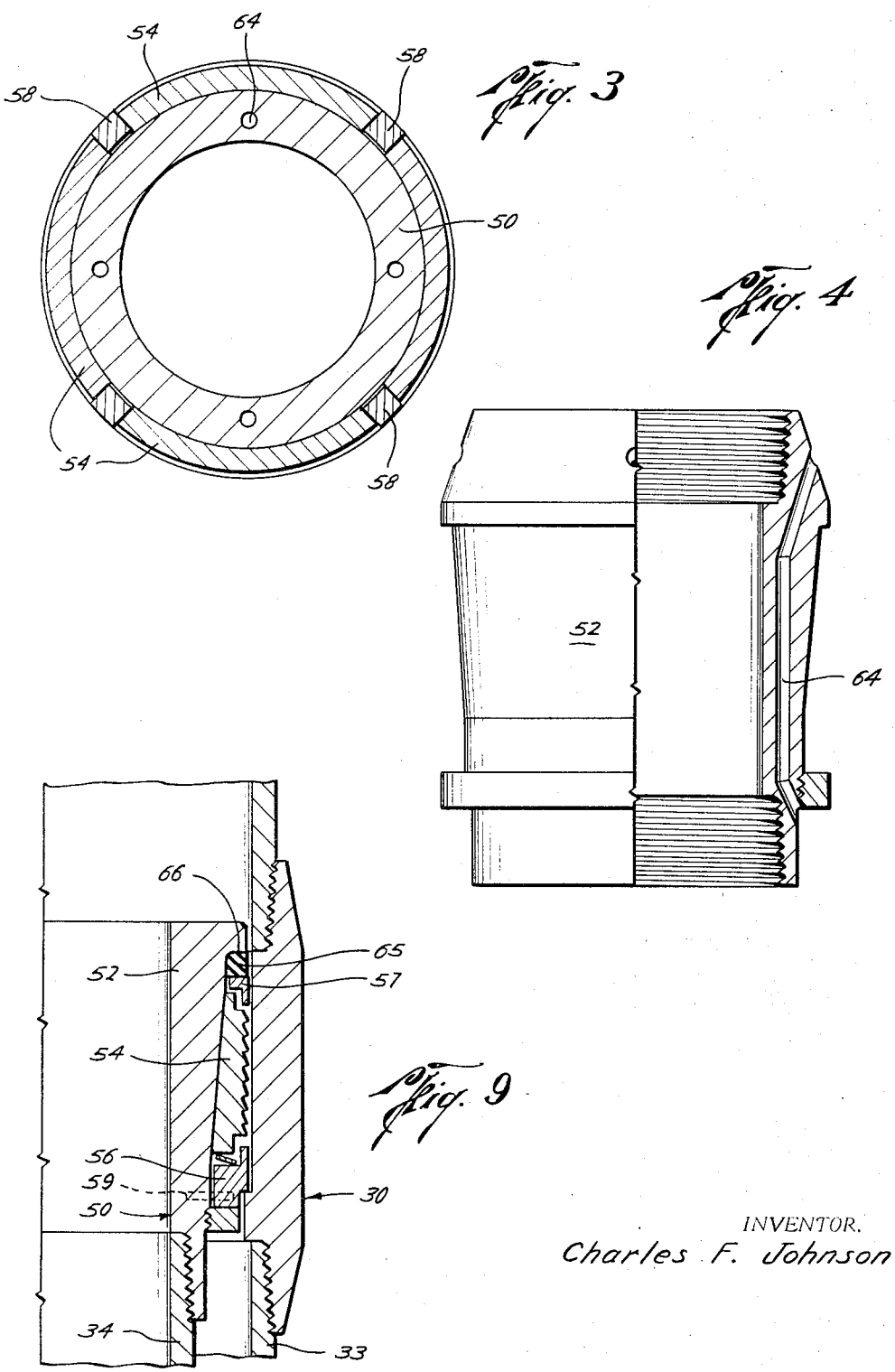

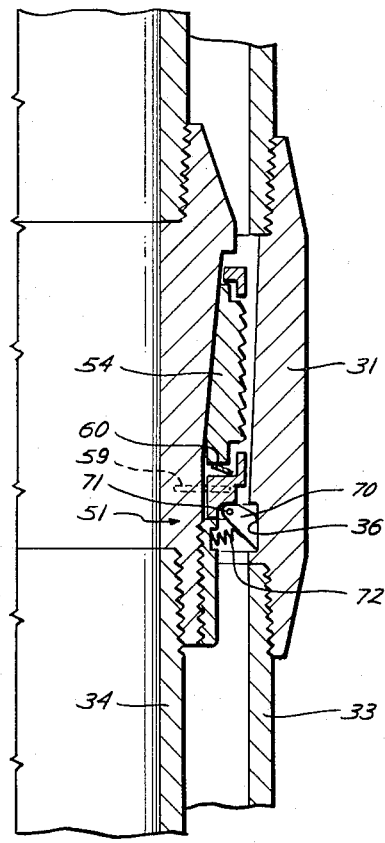
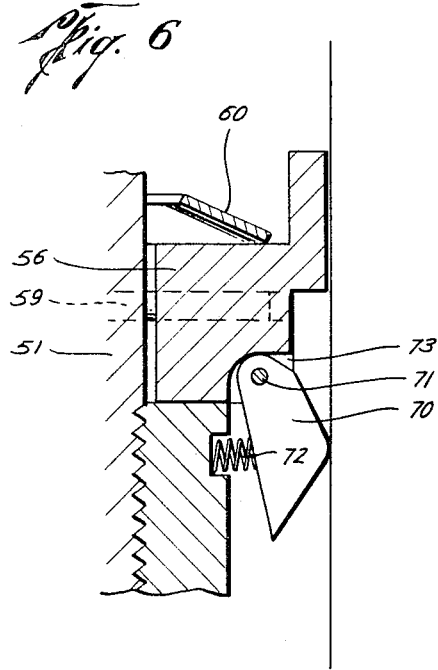
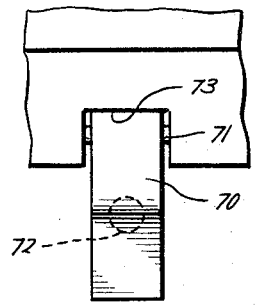
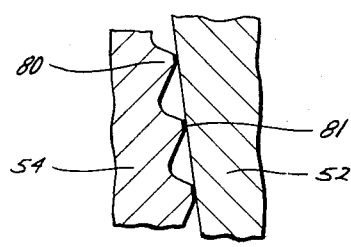
INVENTOR.
Charles F. Johnson

United States Patent Office 3,367,002
Patented Feb. 6, 1968

3,367,002
AUTOMATIC SLIP SETTING DRILL PIPE
SUSPENSION APPARATUS
Charles F. Johnson, Houston, Tex., assignor to Rockwell Manufacturing Company, Houston, Tex., a corporation of Pennsylvania
Filed Aug. 9, 1966, Ser. No. 571,205
22 Claims. (Cl. 24—263)

ABSTRACT OF THE DISCLOSURE

Pipe suspension apparatus for use in oil and gas wells. Included is a full opening wellhead support means with only a small shoulder or groove on its interior wall. In a preferred embodiment, its interior is cylindrical. In another embodiment the interior is the frustum of a right inverted cone with a very small taper. A pipe holding means with a downwardly tapered mandrel on its exterior is suspended in the support means by wedge means which includes slips with downwardly converging inner faces for cooperating with the tapered mandrel. The outer faces of the slips have teeth thereon to engage the interior of the support means. Initially these slips are held in a cage inwardly free of engagement by an attachment means. As the pipe holding means and wedge means are lowered into place within the support means, a portion of the attachment means engages the small shoulder or groove on the interior of the support means releasing the cage and the slips therein for moving upwardly and the slips outwardly relative to the mandrel causing the slips to engage the support means for anchoring the pipe holding means thereto.

---

This invention pertains to oil and gas well apparatus and more particularly to suspension or anchoring devices used to hang casing or tubing within the well bore.

More specifically the invention pertains to suspension or anchoring apparatus utilizing slips.

Normally in well pipe suspension apparatus of the slip type, several slips are disposed concentrically around the pipe to be suspended or anchored. The inner faces of the slips form a cylinder on the surface of which are sharp circumferentially extending teeth. These teeth serve as a means to engage the pipe by indention of the surface thereof sufficient to prevent relative axial motion of the pipe and slips. The outer faces of the slips are normally tapered forming a cone, the cone axis being concentric with the axis of the cylindrical front faces. The outer faces of the slips rest upon the tapered inner surface of a wellhead or support means. The two tapered surfaces form a cooperative wedging means. Upon downward axial motion of the pipe to be suspended and the force of gravity upon the slips, the teeth on the inner face of the slips engage the pipe. The pipe is then prevented from further downward motion relative to the slips. The pipe is then suspended and supported through the cooperative wedging means.

The necessity that the inner face of the wellhead or support means be tapered results in a reduced diameter within the casing or well bore. This limits the passage of well equipment during drilling and completion of the well to diameters somewhat less than the casing bore. This may be overcome on surface wells by using a removable support held in place in the wellhead by stops which may be removed or recessed during periods in which access to the entire diameter of the casing or well bore is desired. However, in wellheads which are relatively inaccessible or remote such as in underwater wells, this may be extremely difficult.

A principal object of the present invention is to provide a means of hanging or anchoring casing or tubing so that very little or no taper is required on the supporting element, thereby providing a full opening, so that the passage of well equipment through the well bore will not be hindered by a smaller diameter.

Another object of the invention is to provide a pipe anchoring device such as the one to be described which may easily be installed in remotely located wellheads such as those underwater.

Briefly, the pipe suspension apparatus in accordance with the preferred embodiments of the invention comprises a pipe holding means, support means, and wedge means therebetween. The pipe holding means is a downwardly tapered tubular mandrel adapted for connection to the pipe to be suspended. The support means includes a wellhead or casing collar having a substantially full opening cylindrical or only slightly tapered bore therethrough. The wedge means includes a plurality of downwardly tapered slips mounted in a guiding and positioning slip cage and disposed between the support means and pipe holding means. Attachment means, e.g. shear pins, hold the slip cage to the mandrel in an inoperative or retracted position. The pipe holding means and the wedge means form a pipe hanger, e.g. a casing hanger or tubing hanger.

In use, after the pipe, e.g. casing or tubing, has been run into the well, the pipe hanger is connected to the last length of pipe. Normally this is accomplished simply by screwing the tapered tubular mandrel to the upper end of the pipe, the wedge means already being in place around the mandrel. The pipe is then lowered until the pipe hanger is in the support means. Cooperative stop means are provided on the support means and slip cage to limit downward travel of the slip cage in the support means. When such travel is arrested further downward motion of the pipe and tapered mandrel cause the shear pins to be sheared to free the slip cage for axial motion relative to the mandrel. Further downward motion of the mandrel causes the slips to move radially outward into the support means. Teeth on the outer surface of the slips bite into the support means and prevent downward movement of the slips. The pipe weight is thereby transferred from the mandrel through the slips to the support means.

For a further and more detailed description of the invention reference will now be made to the accompanying drawings wherein:

FIGURE 3 is a horizontal section taken along line 3—3 in FIGURE 2;

FIGURE 4 is an elevation half in section of a tubular mandrel showing a fluid duct therethrough;

FIGURE 5 is an elevation in half section of a casing being suspended in another casing by an anchoring device embodying a modified form of the invention;

FIGURE 6 is an enlarged section of the cooperative stop means shown in FIGURE 5;

FIGURE 7 is an enlarged partial elevation of the cooperative stop means shown in FIGURE 6;

FIGURE 8 is an enlarged partial section of a modified form of wedge means of the invention; and FIGURE 9 is an elevation in half section of a casing being suspended in another casing by an anchoring device embodying another modified form of the invention.

Figure 1:
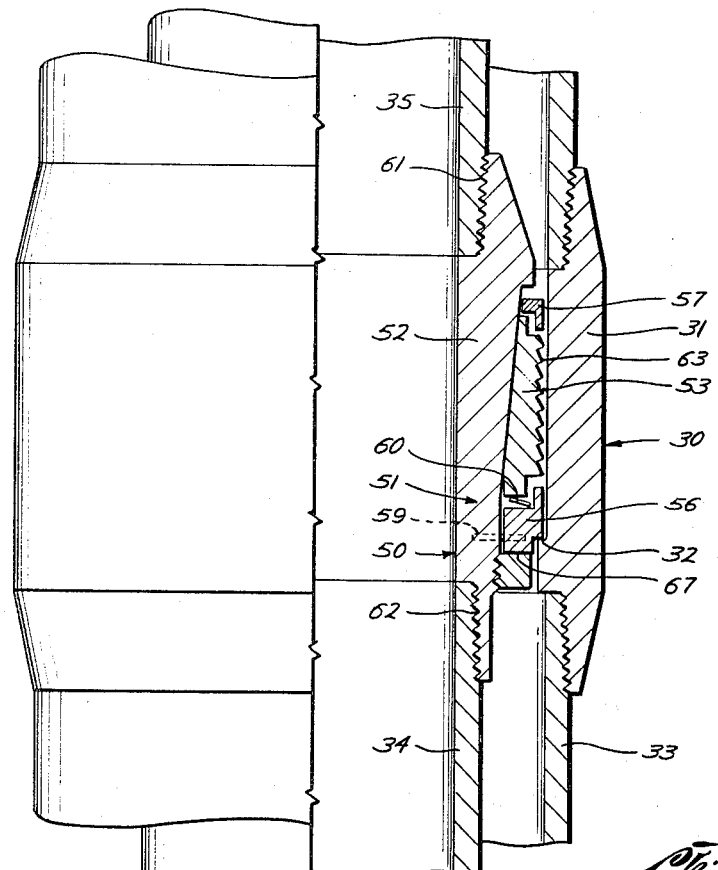
FIGURE 1 is an elevation half in section of a casing being suspended in another casing by an anchoring device embodying the invention.

Referring now to FIGURE 1, there is shown a pipe support means 30 comprising a casing collar 31 and a stop shoulder 32. Casing collar 31 is generally circular in cross section, the outer face being cylindrical, the inner face being either cylindrical or slightly tapered downward. (FIGURE 5 shows such a tapered inner surface.) The stop shoulder 32 is circumferentially machined on the inner face of the support means near its base. Support means 30 is secured to the upper end of casing 33. Passing axially through the support means 30 is a pipe 34, e.g. casing or tubing, suspended in the support means by pipe hanger 50. The pipe hanger includes pipe holding means 51 with threads 61 and 62 at each end, tapered tubular mandrel 52 therebetween, and wedge means 53. The mandrel 52 is circular in cross section, its inner face being cylindrical, its outer face being conical.

Figure 2:
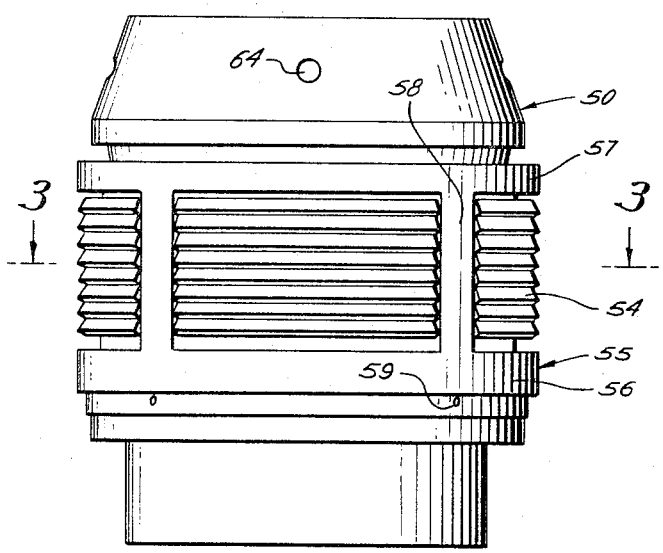
FIGURE 2 is an elevation of a pipe hanger embodying the invention.

Referring now to FIGURES 2 and 3, the wedge means 53 comprises a plurality of slips 54 disposed in a guiding and positioning slip cage 55. Slip cage 55 comprises lower ring 56 and upper ring 57, connected by vertical strips 58 which separate the plurality of slips 54.

Referring again to FIGURE 1 the slip cage is attached to the pipe holding means 51 by shear pins 59 and rests on a shoulder 67 on the lower cylindrical portion of the pipe holding means 51. The slips 54 are generally circular in cross section, the outer face being cylindrical and the inner face being tapered from bottom to top so that the slips are thinner at the upper portion than they are at the base. The slips 54 are held in position by shoulders on the upper and lower rings 56 and 57 of the slip cage 55 and are separated by the vertical strips 58 of the slip cage. Compressible support means 60 are mounted between the base of the slips 54 and the lower ring 56 of the slip cage 55. The compressible support means 60 initially support the slips 54 in the upper portion of the slip cage 55.

The slips 54 are made with engaging means 63, sharp downwardly pointing teeth, on their outer faces. These teeth are conveniently formed by cutting a helical thread on the exterior of a sleeve that is later cut into segments to form a set of slips. The teeth are unloading with reference to their upper flanks in that the angles between the teeth flanks and the base material are obtuse angles allowing the pipe hanger 50 to be easily removed when necessary. Matching teeth may be provided on the wall of the casing collar 31. Upon downward axial movement of the pipe hanger 50 the lower ring 56 of the slip cage 55 will contact the small stop shoulder 32 located within the support means 30. The small shear pins 59 will be sheared by further downward motion thereby releasing the slip cage 55 and slips 54. Due to the cooperative wedging action between the conical faces of the slips 54 and the tubular mandrel 52, the slips will move radially outward and slightly downward against the force of the compressible support means 60. As the slips 54 move down and out the teeth 63 on the outer face of the slips 54 bite or engage the inner wall of casing collar 31 providing support for the suspension of the casing string 34.

If desired, radial load limiting means such as those shown in FIGURE 8 and disclosed in United States Patent No. 2,887,754, may be used on the inner face of the slips 54 or the conical outer face of the tubular mandrel 52. As shown in FIGURE 8, teeth 80 may be provided on the inner face of slips 54. Initially the flat crests 81 of the teeth slide up the tubular mandrel 52 as load is applied by the outer teeth gripping the support means. As the load increases, the stress at the area of contact between the crests 81 and the tubular mandrel 52 exceeds the yield point of the material of the tubular mandrel and the teeth 80 dig in. The engagement of the teeth 80 with the tubular mandrel 52 retards further downward movement of the tubular mandrel compared to the movement that would take place if the backs of the slips were smooth and thereby prevents excessive radial inward forces on the tubular mandrel allowing increased casing weight permissible for suspension.

The embodiment of the invention as illustrated in FIGURES 1, 2, 3 and 4 would be used in an extended casing system. Casing would be connected to the top of the pipe holding means 51 by threads 61 and extended to a production wellhead at a location above the anchoring device. In such a use, to provide for passage of fluid, one or more ducts 64 would be radially disposed through the walls of tubular mandrel 52 as shown in FIGURES 2, 3, and 4.

The invention could very easily be adapted for use directly at the production wellhead, in which case the ducts 64 would be unnecessary. If used directly at the wellhead a sealing means 65 such as shown in FIGURE 9, could be attached to the upper part of the pipe hanger 50 sealing the annular space between casing strings 33 and 34. As shown in FIGURE 9 the sealing means 65 such as a plastic ring is mounted between the upper ring 57 of the slip cage and a shoulder 66 at the upper end of pipe holding means 51. After the axial movement of the slip cage is arrested and shear pins 59 are sheared, the tubular mandrel 52 moves downward causing the slips 54 to move radially outward. Since the upper ring 57 is now stationary and the shoulder 66 continues to move downward the sealing means 65 is compressed between the upper ring 57, the shoulder 66 and the wall of support means 30 creating an effective seal.

In either of these preferred embodiments, whether for use in extended casing systems or for use directly at a wellhead, the support means 30 (FIGURES 1 and 9) will have a wall thickness substantially greater than the pipe supported. More specifically the maximum wall thickness will be greater than the minimum wall thickness of the tapered tubular mandrel 52. This will enable the support means to withstand the radial forces exerted through the wedge means.

Referring now to FIGURES 5, 6, and 7 there is shown an alternate cooperative stop means which would require no bore penetrating stop shoulder on the support means 30. Referring to FIGURES 6 and 7, a cooperative latching key 70 is pivotally mounted on a pin 71 in a recess 73 in the lower ring 56 of the slip cage. Attached to the key 70 near the outer radius of key rotation is a spring 72 which is also attached to the pipe holding means 51. In its compressed position the spring 72 pushes the key 70 radially outward contacting the inner wall of support means 30 or its extended casing string as the pipe hanger is lowered into the casing bore. Referring now to FIGURE 5, as the pipe hanger moves downward in the casing bore, the key 70, one or more as required, enters recess 36 which has been circumferentially machined at the base of the inner face of support means 30. The key 70 and recess 36 are cooperatively designed so that the key 70 will engage the recess 36 but will not engage any other recesses it may encounter as it travels down the well bore. When key 70 engages recess 34 the downward motion of the slip cage is arrested, the shear pins 59 are sheared releasing the slip cage and allowing the slips 54 to engage the supporting means 30 in the same manner as heretofore described.

While preferred embodiments of the invention have been shown and described, many modifications thereof can be made by one skilled in the art without departing from the spirit of the invention and it is intended to protect by Letters Patent all forms of the invention falling within the scope of the following claims:

1. A pipe suspension apparatus comprising a support means having an opening therethrough; a pipe holding means disposed in said opening, said pipe holding means having a tapered tubular mandrel thereon and including means for supporting pipe; wedge means symmetrically disposed between said support means and pipe holding means, said wedge means including a plurality of slips, a guiding and positioning means slidably holding said slips in position around said pipe holding means, and support gripping means on the exterior of said slips, the exterior face of said slips being geometrically correlative with the interior of said support means, the interior faces of said slips being downwardly converging and cooperative with the downwardly converging surface of said tapered tubular mandrel; shearable attachment means initially connecting said wedge means to said pipe holding means; and cooperative stop means in the interior of said support means to contact and prevent downward motion of said wedge means, to shear the attachment means and free the pipe holding means to move downward relative to said wedge means and cause said tapered tubular mandrel to move said slips radially outward to cause said support gripping means to grip the interior of said support means to ultimately prevent further downward movement of said pipe holding means relative to said support means.

2. The combination of claim 1 in which the opening through said support means is generally cylindrical, said support means maximum wall thickness being greater than the minimum wall thickness of said tapered tubular mandrel.

3. The combination of claim 1 in which the opening through said support means is tapered and downwardly converging, the angle of taper being less than the angle at which the face of said tapered tubular mandrel lies from the vertical axis of said pipe holding means, said support means maximum wall thickness being greater than the minimum wall thickness of said tapered tubular mandrel.

4. The combination of claim 1 in which said guiding and positioning means is an annular cage device in which said slips are supported and initially held near the upper portion of said cage device by compressible means so that upon shearing of said attachment means and downward movement of said pipe holding means said slips move radially outward and downward against said compressible means to cause said support gripping means to effectively grip said support means and to ultimately prevent further downward movement of said pipe holding means.

5. The combination of claim 1 in which said stop means includes a small shoulder of such small dimension as necessary to shear said attachment means.

6. The combination of claim 1 in which said stop means includes a recess within said support means and a cooperative latching means pivotally attached to said guiding and positioning means and compressibly held against said support means so that upon downward movement of said pipe holding means said latching means positively engages said recess to prevent further downward movement of said cooperative latching means causing said attachment means to be sheared and allowing said wedge means to become operable.

7. The combination of claim 1 in which said pipe holding means includes a means for passing fluid through its walls.

8. The combination of claim 1 in which said pipe holding means includes a sealing means concentrically disposed at the upper end of said tubular mandrel.

9. A pipe anchoring device comprising support means having a generally cylindrical opening therethrough; a pipe holding means disposed in said opening, said pipe holding means having a tapered tubular mandrel thereon and including means for supporting pipe; annular wedge means concentrically disposed between said support means and pipe holding means, said annular wedge means including a plurality of slips, annular guiding and positioning means concentrically disposed between said support means and pipe holdings means to slidably hold said slips in position around said pipe holding means, compressible support means to initially hold said slips in the upper portion of said annular guiding and positioning means, and support gripping means on the exterior of said slips, said support gripping means comprising a plurality of sharp crested teeth, said teeth being harder than the cylindrical surface of said support means, the crests of said teeth lying in the surface of a cylinder correlative to said cylindrical surface of said support means, the downwardly facing flanks of said teeth making acute angles with the base material of the support gripping means, the upwardly facing flanks of said teeth making an obtuse angle with the base material of the support gripping means, a downwardly converging conical surface on the interior of said slips which cooperates with the exterior surface of said tapered tubular mandrel on said pipe holding means; attachment means initially connecting said wedge means to said pipe holding means; and stop means in the interior of the support means to contact and prevent downward motion of the annular wedge means to shear the attachment means and free the pipe holding means to move downward relative to said wedge means and cause the tapered tubular mandrel to move said slips radially outward and downward against the compressible support means to cause the support gripping means to grip the interior of the support means and hold the annular wedge means against downward movement relative to said support means and ultimately thereafter to support said pipe holding means against downward movement relative to said support means.

10. The combination of claim 9 in which said stop means consists of a small shoulder of such small dimension as necessary to shear said attachment means.

11. The combination of claim 9 in which said stop means comprises a recess within said support means and a cooperative latching means pivotally attached to said guiding and positioning means and compressibly held against said support means so that upon downward movement of said pipe holding means said latching means positively engages said recess to prevent further downward movement of said cooperative latching means causing said attachment means to be sheared and allowing said cooperative wedging means to become operable.

12. A pipe anchoring apparatus comprising a support having a smooth opening therethrough; a pipe holding means disposed in said opening, said pipe holding means having a tapered tubular mandrel thereon; wedge means disposed symmetrically between said pipe holding means and said support; attachment means holding said wedge means initially in an inoperable position; support gripping means on the outer face of said wedge means, said wedge means having a downwardly converging interior surface correlative with a downwardly converging surface on the exterior of said pipe holding means; stop means located on said support to contact and prevent downward motion of said wedge means to shear the attachment means and to free said wedge means to move radially outward causing said support gripping means to engage said support thereby ultimately preventing further downward movement of the pipe holding means.

13. The combination of claim 12 in which said support opening is cylindrical and the outer face of said wedge means describes a correlative cylinder.

14. The combination of claim 13 in which said stop means includes a small shoulder of such small dimension as necessary to shear said attachment means.

15. The combination of claim 13 in which said stop means includes a recess within said support means and a cooperative latching means pivotally attached to said wedge means and compressibly held against said support means so that upon downward movement of said pipe holding means said latching means positively engages said recess to prevent further downward movement of said cooperative latching means causing said attachment means to be sheared and allowing said wedge means to become operable.

16. The combination of claim 12 in which said support opening describes a frustum of an inverted right cone whose angle of taper is less than the angle at which the inner face of said wedge means lies from the vertical axis of said pipe holding means, said outer face of said wedge means describing a correlative frustum of an inverted right cone.

17. The combination of claim 14 in which said stop means includes a small shoulder of such small dimension as necessary to shear said attachment means.

18. The combination of claim 14 in which said stop means includes a recess within said support means and a cooperative latching means pivotally attached to said wedge means and compressibly held against said support means so that upon downward movement of said pipe holding means said latching means positively engages said recess to prevent further downward movement of said cooperative latching means causing said attachment means to be sheared and allowing said wedge means to become operable.

19. Pipe suspension apparatus comprising:
   support means having an opening therethrough, said support means having at least one groove on the interior thereof;
   pipe holding means disposed in said opening; and
   wedge means releasably attached to said pipe holding means, a portion of said wedge means being adapted to engage at least one said groove to release said wedge means for anchoring to said support means.

20. The combination of claim 19 in which said portion of said wedge means adapted to engage at least one said groove is resiliently biased.

21. The combination of claim 19 in which the exterior surface of said pipe holding means generally describes a frustum of an inverted right cone and said wedge means includes slips, the inner face of said slips being tapered to cooperate with said exterior surface of said pipe holding means, the outer face of said slips having teeth thereon to engage the interior of said support means.

22. The combination of claim 21 in which said slips are supported and guided by an annular cage device mounted on said pipe holding means.

References Cited

UNITED STATES PATENTS

| | | | |
|---|---|---|---|
| 867,735 | 10/1907 | Lewin. | |
| 1,547,461 | 7/1925 | Steele. | |
| 1,604,580 | 10/1926 | Jaques. | |
| 1,902,075 | 3/1933 | Howard | 285—143 |
| 2,693,859 | 11/1954 | Wright | 166—208 X |
| 2,842,209 | 7/1958 | Gibson | 166—75 |
| 2,887,754 | 5/1959 | Johnson | 285—146 X |
| 3,225,833 | 12/1965 | Parkhurst et al. | |
| 3,291,220 | 12/1966 | Mott | 166—208 |

DONALD A. GRIFFIN, *Primary Examiner.*